350-96.25
XR 4,033,687
7 ✗ 350/96.27
196.31

United States [Patent 19]
Hirayama et al.

[11] 4,033,687
[45] July 5, 1977

[54] CATHODE RAY TUBE PICKUP DEVICE

[75] Inventors: Kazuhiro Hirayama, Hachioji; Syusei Tsukada, Tokyo; Takahiro Inoue, Kawasaki, all of Japan

[73] Assignee: Canon Kabushiki Kaisha, Tokyo, Japan

[22] Filed: Mar. 3, 1976

[21] Appl. No.: 663,476

Related U.S. Application Data

[63] Continuation of Ser. No. 476,210, June 4, 1974, abandoned.

[30] Foreign Application Priority Data

June 11, 1973 Japan ............................ 48-65617

[52] U.S. Cl. ................................ 355/1; 240/1 EL; 350/96 R; 354/6; 355/3 R; 355/20
[51] Int. Cl.[2] ........................................ G03B 27/00
[58] Field of Search ................. 355/1, 3, 20; 354/6, 354/78; 340/380; 350/96 R; 240/1 EL, 1 LP

[56] References Cited

UNITED STATES PATENTS

| | | | |
|---|---|---|---|
| 3,770,345 | 11/1973 | Kawakubo et al. | 355/3 DD |
| 3,834,803 | 9/1974 | Tsukada | 355/1 |
| 3,890,038 | 6/1975 | Ichikawa | 355/1 |

FOREIGN PATENTS OR APPLICATIONS

| | | | |
|---|---|---|---|
| 2,025,812 | 12/1971 | Germany | 355/1 |
| 28,527 | 6/1968 | Japan | 355/1 |

*Primary Examiner*—Richard A. Wintercorn
*Attorney, Agent, or Firm*—Fitzpatrick, Cella, Harper & Scinto

[57] ABSTRACT

A cathode ray tube pickup device comprises a photosensitive medium having a dielectric layer, a photoconductive layer and conductive layer, a charger for uniformly charging the surface of the photosensitive medium, a discharger for uniformly discharging the charged surface of the photosensitive medium, an optical fiber tube closely spaced from the surface of the photosensitive medium to effect negative image application thereon, and developing means for developing the surface of the photosensitive medium with a toner opposite in polarity to the charge in said surface.

2 Claims, 12 Drawing Figures

CATHODE RAY TUBE PICKUP DEVICE

This is a continuation of application Ser. No. 476,210 filed June 4, 1974, now abandoned.

BACKGROUND OF THE INVENTION

1. Field of the Invention

This invention generally relates to a cathode ray tube pickup device. More particularly, it relates to a cathode ray tube pickup device best suited for application to facsimile reception printers, computer output printers, etc.

2. Description of the Prior Art

Pickup devices comprising a cathode ray tube using an optical fiber tube provided with an optical fiber plate have heretofore been known in combination with silver salt photography, electrofax or the like. These pickup devices have used photosensitive paper as the copy medium, and this has led to a high running cost and offered problems as to the preservability and weight of the record, the touch of the copy paper, etc.

For this reason, it has been considered to apply optical information from a optical fiber tube to the transfer type electrophotographic system which permits cheaper transfer medium such as ordinary paper or the like to be used as the copy medium.

However, the optical fiber used in the optical fiber plate portion of the optical fiber tube is generally of the construction which comprises, as shown in FIG. 1(*a*) of the accompanying drawings, a core glass 1 of high refractive index (say, $n$=1.61), a cladding glass 2 of low refractive index (say, $n$=1.51) and an outermost light absorbing layer 3, and groups of such optical fiber are arrayed in the manner as shown in FIG. 1(*b*), with the adjacent optical fibers joined together as by epoxy resin 4. Thus, it is only the core glass portion that actually transmits the optical information from the cathode ray tube to the photosenstive medium, that is, the portions between the core glasses do not transmit the optical information from the cathode ray tube, thus producing dark shadows. As a result, those portions of the optical information applied from the optical fiber tube to the photosensitive medium which correspond to the dark portions of the original information provide dark regions on the photosensitive medium while, in those portions of the optical information which correspond to the light portions of the original information, the core glass portion 1 is light and the portion 2,4 between core glasses is dark, so that the light portions of the original information as imparted to the photosensitive medium are darkened with the light and the dark alternating.

Also, in order to apply the optical fiber tube to the photosensitive medium, a uniform contact or a predetermined very slight spacing must be maintained between the optical fiber tube and the photosensitive medium. (Such spacing between the optical fiber tube and the photosensitive medium is imperative because the light emitted from the optical fiber plate has a tendency to become dispersed.) In the above-mentioned silver salt photography or electrofax, the photosensitive medium has sufficient flexibility to readily permit its uniform contact with the optical fiber tube, whereas in the transfer type electrophotographic system, the photosensitive medium is usually in the form of a rigid drum and it is very difficult to maintain a predetermined spacing between such drum and the optical fiber tube, in view of the manufacturing error or the like of the drum. Actually, therefore, it has been considered to improve the optical fiber tube, as shown in FIG. 2, by mounting a correcting optical fiber plate 8 on the surface of the optical fiber plate portion 6 of the optical fiber tube 5 which is opposed to the photosensitive medium 7, thereby setting up an optically uniform condition between the photosensitive medium 7 and the optical fiber tube 5 so as to accomplish a clear exposure. In this case, however, the boundaries between the optical information and thus provide dark shadows, which will appear as noise in the light regions of the applied image. Such adverse effect is relatively small in the case of an optical fiber tube provided with a single optical fiber plate, but in the case of an optical fiber tube additionally provided with a correcting optical fiber plate as described above, the dark regions of the two optical fiber plates irregularly overlap each other to produce a noise image which would make the applied image illegible.

In the image application to the photosensitive medium using the optical fiber tube, as described above in detail, the applied image corresponding to the dark portion of the original information provides a dark region but the applied image corresponding to the light portion of the original information provides a lighr region mixed with dark noise.

Such image application effected by the use of an optical fiber tube will now be described with respect to the case where it is applied to the typical electrophotographic process disclosed in U.S. Pat. No. 2,221,776 and known as Carson's process.

In FIG. 3, reference numeral 9 designates a photosensitive medium comprising a photoconductive layer 10 and a conductive substrate 11. In FIG. 3(*a*), the photoconductive layer 10 is uniformly charged with, for example, positive polarity, by a charger 12. Thereafter, as shown in FIG. 3(*b*), image application is effected by an optical fiber tube 13, whereby the charge remains in the region D corresponding to the dark portion of the original information while, in the region L corresponding to the light portion of the original information, all of the other charge other than that corresponding to the noise is discharged, whereby there is formed an electrostatic Latent image. The final copy usually takes the form of a positive image, but in the electrophotographic process now under discussion, a positive image may be formed (1) by effecting a positive image application and developing the electrostatic latent image corresponding to the dark portion of the original information or (2) by effecting a negative image application and developing the electrostatic latent image corresponding to the light portion of the original information. In the case (1) above, however, the electrostatic latent image corresponding to the noise portion is also developed during the development of the electrostatic latent image corresponding to the dark portion of the original information and after all, the final copy obtained will be unclear with the light region being fogged. In the case (2) above, the fog resulting from the noise is eliminated during the development of the electrostatic latent image corresponding to the light portion but such electrostatic latent image would be at a lower or zero potential as compared with the electrostatic latent image corresponding to the dark portion, and such an electrostatic latent image of low potential is undesirable in that, when developed, it could hardly provide a half-tone or would produce an edge effect.

SUMMARY OF THE INVENTION

It is therefore a primary object of the present invention to provide a cathode ray tube pickup device which can produce clear copy images free of any edge effect and having a good half-tone.

It is another object of the present invention to provide an improved cathode ray tube pickup device which prevents appearance of any noise image which would otherwise result from the image application effected by the optical fiber tube.

With the novel and improved cathode ray tube pickup device of the present invention, the image application from the optical fiber tube is effected in the form of a negative image application so that the noise image resulting from the presence of the optical fiber plate may be eliminated in the background of the original image and that the electrostatic latent image formed on a photosensitive medium as a result of said image application may be an electrostatic latent image of high potential corresponding to the light portion of the original image and such latent image may be developed.

The invention will become more fully apparent from the following detailed description taken in conjunction with the accompanying drawings.

DESCRIPTION OF THE PREFERRED EMBODIMENTS

Figure 1A:
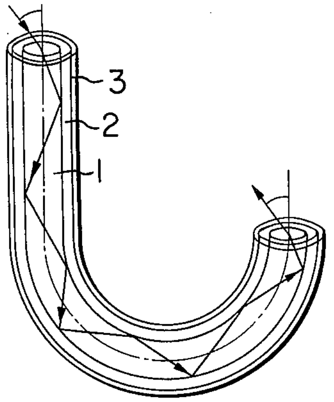
FIG. 1(*a*) and (*b*) show the construction of an optical fiber and an optical fiber plate and illustrate the characteristics thereof.
Figure 1B:
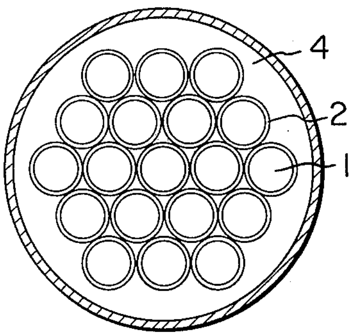
Figure 2:
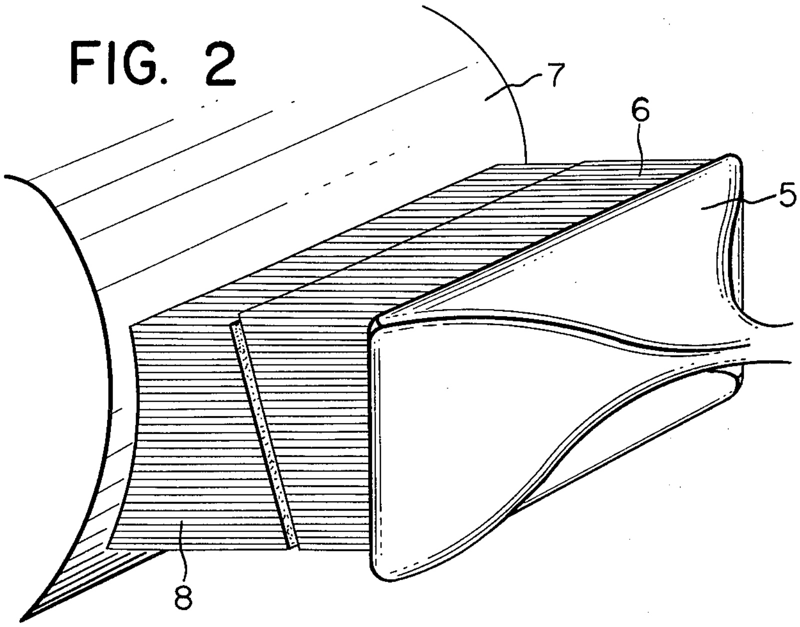
FIG. 2 illustrates the construction of an improved optical fiber tube applicable to the cathode ray tube pickup device of the present invention.
Figure 3A:
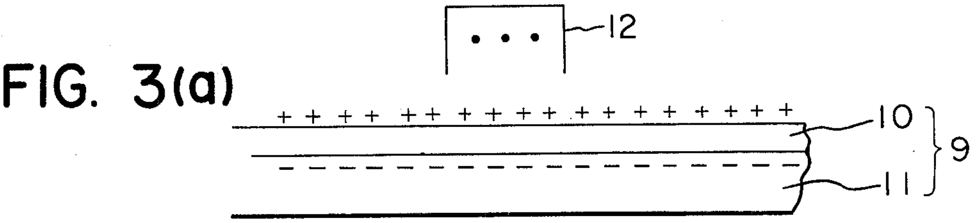
FIGS. 3(*a*) and (*b*) illustrate a sequence of steps during which an electrostatic latent image is formed when image application from the optical fiber tube is effected upon a conventional electrophotographic process.
Figure 3B:
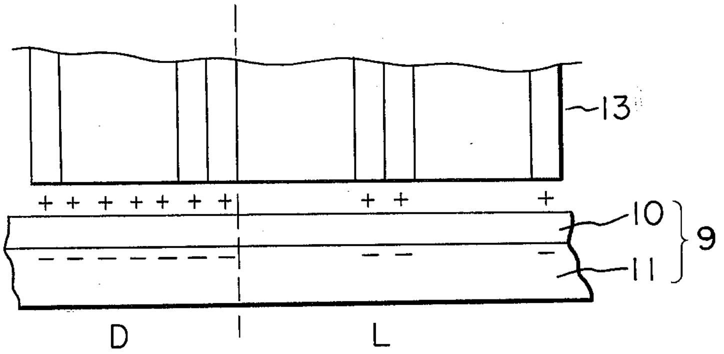

Reference was already made to FIGS. 1 to 3.

Figure 4:
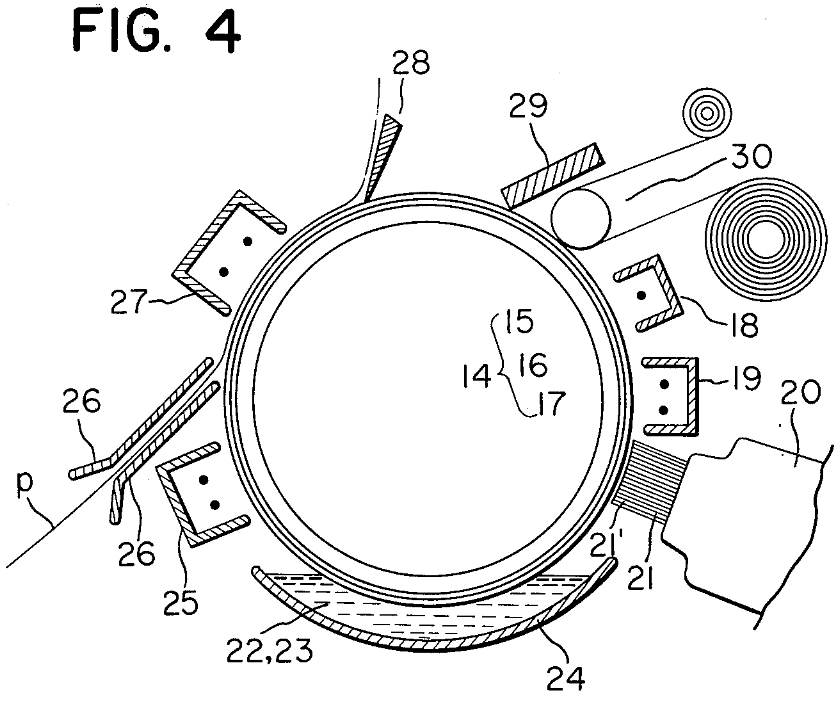
FIG. 4 illustrates the construction of the cathode ray tube pickup device according to an embodiment of the present invention.

Referring now to FIG. 4, there is shown a photosensitive drum 14 around which is set a photosensitive medium comprising a conductive substrate 15, a photoconductive layer 16 and a dielectric layer 17 and which is rotatable in the direction of the arrow. The photosensitive medium is not restricted to the form of a drum but may take any other suitable form such as a belt, an endless belt or the like.

Although the photosensitive medium 14 is shown to basically comprise three layers, i.e. conductive layer 15, photoconductive layer 16 and dielectric layer 17, yet a boundary layer for controlling movement of the electric charge may be formed between the conductive layer and the photoconductive layer, and a capture layer for singly capturing the electric charge may further be formed on or adjacent the surface of the photoconductive layer.

The conductive back-up member 15 may be formed of tin, copper, aluminum or other metal conductor and hygroscopic paper, and particularly, a back-up member formed of paper with aluminum foil attached thereto would be economically advantageous and in addition, would be convenient for use around a drum or the like. The material of the photoconductive layer may be any one or a mixture of CdS, CdSe, crystalline Se, ZnO, ZnS, Se. $TiO_2$, Se-Te, and PbO. Even crystalline selenium, a photoconductive material of low resistance, the use of which has heretofore been prevented because of the requirement that it should retain a charge in itself, can be used with a good result. According to the present invention, ZnO may also be used to provide a much higher sensitivity than before, and highly photoconductive materials such as CdS, CdSe, crystalline Se, etc. are the high-sensitivity materials particularly suitable for use with the present invention and the use of these materials could enhance the sensitivity up to ASA 100 or higher. The dielectric layer 17 may be formed of any material which will satisfy these three requirements — great anti-abrasion strength, capability of retaining electrostatic charge at a high resistance, and transparency. Coating of fluoric resin, polycarbonate resin, polyethylene resin, cellulose acetate resin or like material may be used and among these, the fluoric resin which can be readily cleaned is particularly preferable in carrying out the present invention because the photosensitive medium must be cleaned for repeated use after development and transfer.

Figure 6:
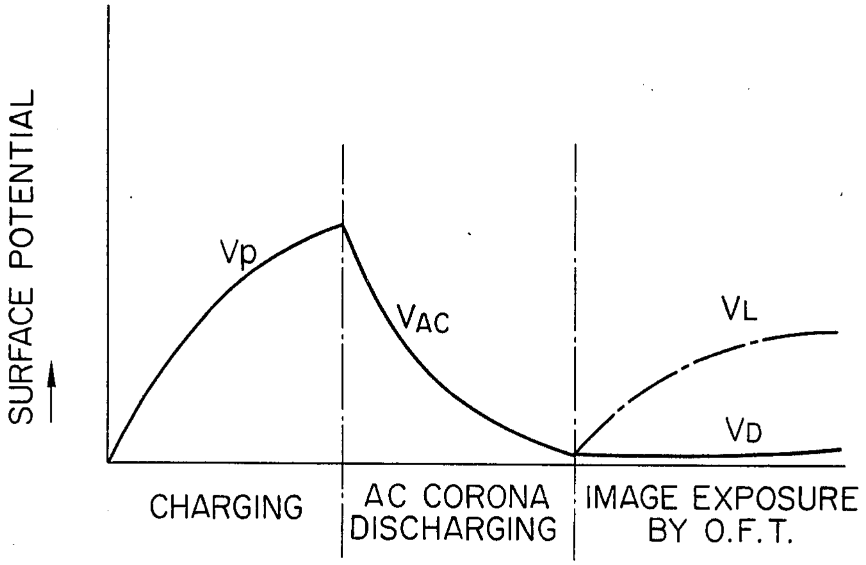
FIG. 6 is a graph illustrating the variations in the surface potential of the photosensitive medium during the electrostatic latent image forming steps shown in FIGS. 5(*a*), (*b*) and (*c*).
Figure 5A:
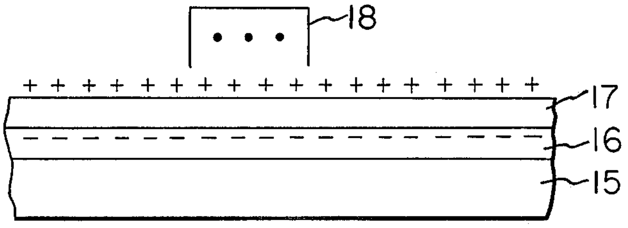
FIGS. 5(*a*), (*b*), (*c*), (*d*) and (*e*) illustrate the principles underlying the successive steps of the electrophotographic process in the cathode ray tube pickup device shown in FIG. 4.
Figure 5B:
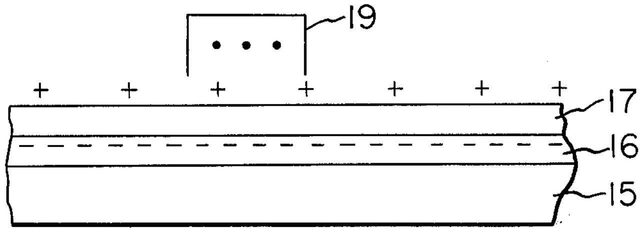
Figure 5C:
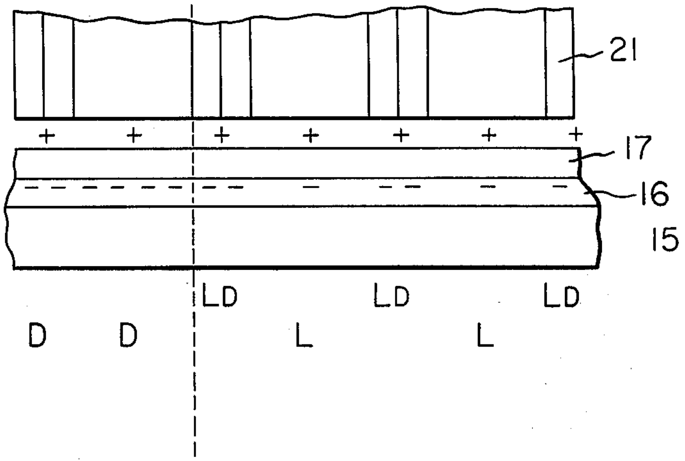
Figure 5D:
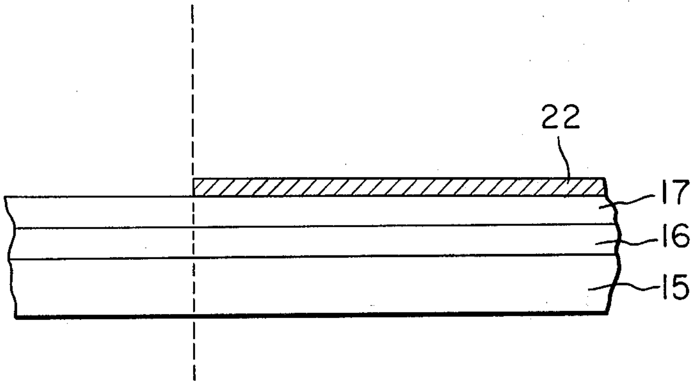
Figure 5E:
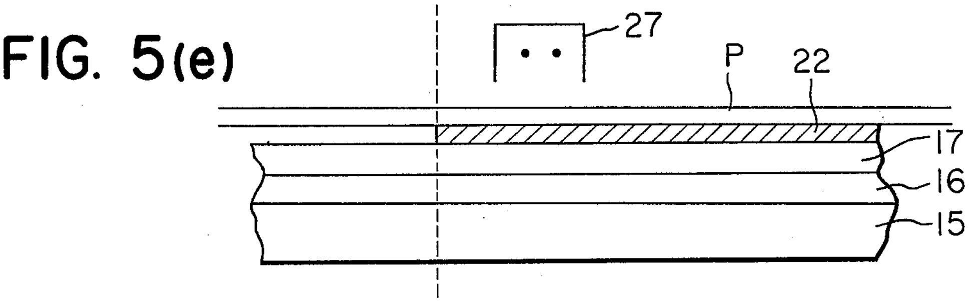

When the dielectric layer surface 17 of the photosensitive medium 14 is first charged with, for example, positive polarity, by a DC corona discharger 18, it is believed that negative charge is introduced into the photosensitive medium from the side of the conductive back-up member 15 and captured in the interface between the photoconductive layer 16 and the dielectric layer 17 or in the interior of the photoconductive layer which is nearer to the dielectric layer 17, see FIG. 5(*a*). Thus, through such charging process, the surface potential of the dielectric layer 17 presents a characteristic as indicated by curve $V_p$ in FIG. 6. This charging may of course be effected by the use of an electrode, in lieu of the corona discharger.

The polarity of the charge during the above-described charging process may preferably be positive if the photoconductive material 16 is a N-type semiconductor, or may be negative if the photoconductive material 16 is a P-type semiconductor. However, this is not absolutely imperative but charging with the opposite polarity to that described above may result in formation of an electrostatic latent image. In this latter case, the charging may take place in light.

Subsequently, AC corona charge is applied from an AC corona discharger 19 to the charged dielectric layer surface 17 to attenuate part or all of the surface charge. Since this process occurs in dark, it is believed that the photoconductive layer 16 presents a sufficiently high resistance so that, in spite of the attenuated surface charge, the charge captured in the photoconductive layer 16 through the previous charging process may remain unchanged, see FIG. 5(*b*). As a result, the filed of the charge remaining on the surface of the dielectric layer 17 acts more intensely on the photoconductive layer 16 and during the present process, the surface potential of the dielectric layer 17 exhibits a characteristic as indicated by curve $V_{AC}$ in FIG. 6, which curve shows a sharp decrease of the surface potential with the AC corona discharging time.

Next, the surface of the photosensitive drum is exposed to the image light transmitted from a cathode ray tube (CRT) 20 through an optical fiber plate 21 spaced apart a predetermined distance from the surface of the photosensitive drum. A correcting optical fiber plate 21' may additionally be provided in the manner as previously described. When the exposure occurs, the state of the photoconductive layer 16 in the region thereof corresponding to the dark portion of the original image is not so much changed but maintains a state of high resistance and thus, the charge captured within the photoconductive layer is attenuated very little, see FIG. 5(*c*). As a result, the surface potential of the dielectric layer 17 exhibits a value substantially equal to the surface potential during the previous process, as indicated by curve $V_D$ in FIG. 6.

In the region corresponding to the light portion of the original image, the photoconductive layer 16 reduces its resistance and becomes conductive so that the charge captured within such region is now free and most of such charge discharges into the conductive back-up member 15. Therefore, almost all of the field of the surface charge, which has considerably intensely been acting on the interior during the previous process, will now act on the exterior to sharply increase the surface potential of the dielectric layer 17 upon application of the original image, as indicated by curve $V_L$ in FIG. 6. In other words, the surface potential in the region corresponding to the light portion of the original image becomes higher than that in the region corresponding to the dark portion of the original image. As a result, there is a surface potential difference ($V_L$-$V_D$) produced in the surface of the dielectric layer in accordance with the dark-and-light pattern of the original image, and such surface potential difference forms on the surface of the dielectric layer 17 an electrostatic latent image corresponding to the original image. The region of the photosensitive medium corresponding to the dark portion of the original image is exposed to a somewhat dark noise image $L_D$ resulting from the presence of the optical fiber plate, as described previously, and therefore, the resultant electrostatic latent image includes some region whose surface potential is lower than the surface potential corresponding to the light image portion L, but the surface potential in such region of the latent image is much higher than the surface potential corresponding to the dark image portion D, so that a clearly developed image which is entirely free of noise may be provided through the inversion development technique to be described hereinafter. Since the surface potential depends on the image exposure time as well as the primary charging and the AC corona discharging, obtainment of a great surface potential different would require the corona discharging time and the image exposure time to be suitably selected with such factors as the photosensitive medium, the discharging environment, etc. taken into account.

When the electrostatic latent image so formed is developed by a liquid developing device containing therewithin negatively charged toner 22 and carrier liquid 23, the toner will deposit only on the regions of the latent image which have a high surface potential. The developing technique is not restricted thereto but other known developing technique such as magnet brush developing technique, cascade developing technique or the like may equally be employed. In this manner, there is provided a visible image as shown in FIG. 5(*d*).

Thereafter, the surface of the photosensitive drum is positively charged by an excess developer squeeze charger 25 to squeeze out any excess developing liquid. (In the charging for the purpose of squeezing out the developing liquid, the use of the same polarity as that of the toner results in a better squeezing effect and a clearer developed image than the use of the opposite polarity which tends to disturb the image.) Subsequently, a transfer medium P is passed through a guide 26 so as to wrap over the surface of the photosensitive drum carrying thereon the developed image, whereafter negative charge is applied from a corona discharger 27 to the back side of the transfer medium to impart a transfer field, thus effecting image transfer, see FIG. 5(*e*). Then, the transfer medium, if it is in the form of a sheet, may be separated and removed from the surface of the photosensitive drum by separator means 28. Subsequently, the photosensitive drum is cleaned by a blade cleaner 29 for reuse. In order to positively protect the face plate of the optical fiber against contamination, the surface of the drum may very effectively be re-cleaned by its frictional contact with a cleaning web 30 which may be formed of flannel. Japanese paper or like material.

According to the present invention, as described above, the dielectric layer surface of the photosensitive medium basically comprising a conductive back-up member, a photoconductive layer and a dielectric layer, is charged to cause the photoconductive layer to capture the charge of the opposite polarity, whereafter AC corona discharge is applied to said surface while maintaining a balanced relationship with the latter charge, and then light carrying an original image is applied to said surface to form an electrostatic latent image on the dielectric surface with the aid of the coaction occurring therebetween. The electrostatic latent image so formed has an intense outer charge field and great surface potential difference, which means a greatly enhanced sensitivity. Further, the electrostatic latent image once formed on the dielectric layer surface must be passed through the processes of development, transfer and cleaning, but by selecting a high resistance and a great anti-abrasion strength for the dielectric layer, the surface of such layer may be substantially protected against the injury of deterioration which would result from the friction or pressure imparted thereto, and accordingly the inner photoconductive layer may be protected against the surface deterioration, fatique or other adverse effect. This in turn leads to the provision of a photosensitive medium which can enjoy a very long or even nearly semi-permanent life.

In the above-described electrophotographic apparatus wherein the image application is effected from a cathode ray tube through an optical fiber, if positive image application was effected, the boundaries between the groups of optical fiber would be somewhat dark and the dark would readily be printed as noise into the resultant copy, which noise would in turn cause fog during development. In the present apparatus, therefore, negative image application is employed in particular and the resultant electrostatic latent image is inverted and developed, whereby production of the fog may be reduced. This apparatus is particularly suited for the cathode ray tube pickup device which is directed chiefly to line copies.

A specific example of the cathode ray tube pickup device according to the present invention will now be described.

A photosensitive medium was prepared by using an aluminum drum as the conductive substrate, evaporating Se-Te alloy (Te 20% by weight) on the substrate to a thickness of 40 microns to form a photoconductive layer (the evaporation source was a quartz board at temperatures of 280° — 290° C with the substrate at temperatures of 65° - 75° C), adjusting a monomer liquid of acryl-polyurethane copolymerized resin to a viscosity of 100 poise, dipping the drum in such liquid and removing the drum from the liquid at the rate of 20 mm per minute. Thereafter, the drum was irradiated by an ultraviolet ray lamp of 4 KW for 6.5 minutes to polymerize the liquid on the drum. This was repeated three times, whereby a dielectric layer as thick as 20 microns was provided. The photosensitive medium thus obtained was charged to −1800 volts by a negative corona charger, and subsequently discharged to about zero volt by an AC corona discharger, thereafter exposed to light to provide −200 volts for the dark region and −800 volts for the light region. thus producing a contrast of 600 volts. The latent image so formed was developed into a visible image by means of a developing liquid composed of toner particles having an average size of 2 to 4 microns and given the positive polarity by the addition of cobalt naphthenate thereto (the base of the developing liquid was ISOPAR H, tradename). Subsequently, the surface of the photosensitive medium was entirely charged to +1800 volts by a developer squeeze charger to remove the excess liquid developer on the surface of the photosensitive medium, whereafter a transfer medium was superposed upon that surface and the transfer was effected by negative corona charge from a transfer charger, whereby a good positive image was obtained. During that time, the spacing between the optical fiber face plate of the cathode ray tube and the surface of the photosensitive medium was maintained at about 100 microns. The brightness was about 10 foot lamberts. As the result of the experiment, it has been found that the spacing must be about 500 microns or less in order to provide a desired resolving power.

From the foregoing detailed description, it will be appreciated that the cathode ray tube pickup device of the present invention, if particularly applied to the liquid developing system, eliminates or reduces the scattering of toner particles or the like and the contamination of the optical fiber plate which would be experienced when the device is applied to the dry developing system. Further, a web cleaner combined with the device will achieve the purpose completely. Also, the dielectric layer covering the surface of the photosensitive medium protects the photoconductive layer in the photosensitive medium against the deterioration which would otherwise be imparted by the developing liquid.

We claim:

1. A cathode ray tube pickup device comprising:

a photosensitive medium having a dielectric layer, a photoconductive layer and a conductive layer;

means for uniformly charging the surface of said photosensitive medium;

means for uniformly discharging the charged surface of said photosensitive medium;

an optical fiber tube disposed closely adjacent to the surface of said photosensitive medium to apply a light image to the previously charged and discharged surface thereof to form a latent image upon said surface; and means for developing the latent image on the surface of said photosensitive medium with a liquid developer including a toner having a charge polarity for developing that portion of the latent image corresponding to the light portion of the light image, wherein the developed image is a negative of the light image.

2. A cathode ray tube pickup device as set forth in claim 1, further comprising means for removing excess liquid developer from the surface of said photosensitive medium, and means for transferring the developed image onto a transfer medium.

* * * * *

UNITED STATES PATENT AND TRADEMARK OFFICE

CERTIFICATE OF CORRECTION

PATENT NO. : 4,033,687

DATED : July 5, 1977

INVENTOR(S) : KAZUHIRO HIRAYAMA, SYUSEI TSUKADA, TAKAHIRO INOUE

It is certified that error appears in the above-identified patent and that said Letters Patent are hereby corrected as shown below:

Column 1, line 54, after "the" (first occurrence) insert --optical information from the--.

Column 2, line 11, after "optical" insert --fiber groups do not transmit optical--;

line 26, change "lighr" to read --light--;

line 45, change "Latent" to read --latent--.

Column 6, line 29, delete "." and insert --,--;

line 51, delete "of" and insert --or--;

line 55, change "fatique" to read --fatigue--.

Column 7, line 27, delete "." and insert --,--.

Signed and Sealed this

*Twentieth* Day of *September 1977*

[SEAL]

*Attest:*

RUTH C. MASON
*Attesting Officer*

LUTRELLE F. PARKER
*Acting Commissioner of Patents and Trademarks*